US008825705B2

(12) United States Patent
Thayne et al.

(10) Patent No.: US 8,825,705 B2
(45) Date of Patent: Sep. 2, 2014

(54) SYSTEMS AND METHODS FOR COMMUNICATION AMONG COLLABORATING USERS

(75) Inventors: Preston Thayne, Lindon, UT (US); Mike Smeltzer, Lehi, UT (US); Barry Watts, American Fork, UT (US); Tobin Fullmer, Elk Ridge, UT (US); Danny Darais, Lehi, UT (US); David Graham, Springville, UT (US); Scott Echols, Orem, UT (US)

(73) Assignee: Ancestry.com Operations, Inc., Provo, UT (US)

( * ) Notice: Subject to any disclaimer, the term of this patent is extended or adjusted under 35 U.S.C. 154(b) by 511 days.

(21) Appl. No.: 12/511,023

(22) Filed: Jul. 28, 2009

(65) Prior Publication Data

US 2011/0029521 A1 Feb. 3, 2011

(51) Int. Cl.
*G06F 17/30* (2006.01)
*G06Q 10/10* (2012.01)

(52) U.S. Cl.
CPC .......... *G06F 17/30943* (2013.01); *G06Q 10/10* (2013.01)
USPC ........................................ 707/784

(58) Field of Classification Search
USPC .................. 707/706, 708, 732, 736, 999.001, 707/999.003, 999.1
See application file for complete search history.

(56) References Cited

U.S. PATENT DOCUMENTS

| 2003/0097410 | A1* | 5/2003 | Atkins et al. .................. 709/206 |
| 2006/0004914 | A1* | 1/2006 | Kelly et al. .................... 709/219 |
| 2007/0100798 | A1* | 5/2007 | Kapur ................................ 707/3 |
| 2007/0192299 | A1* | 8/2007 | Zuckerberg et al. .............. 707/3 |
| 2007/0230799 | A1* | 10/2007 | Shniberg et al. .............. 382/224 |
| 2010/0042511 | A1* | 2/2010 | Sundaresan et al. ............ 705/26 |
| 2010/0211644 | A1* | 8/2010 | Lavoie et al. .................. 709/206 |

OTHER PUBLICATIONS

MyHeritage.com. Apr. 24, 2009. <http://web.archive.org/web/20090422085043/http://www.myheritage.com/genealogy>.*

* cited by examiner

*Primary Examiner* — Syed Hasan
(74) *Attorney, Agent, or Firm* — Kilpatrick Townsend & Stockton LLP

(57) ABSTRACT

Embodiments relate to methods and systems for building representations of related subjects. The representations may include a plurality of nodes, each being associated with a subject. Users may be able to access records and/or source documents related to a plurality of subjects and add or modify node characteristics based thereon. Users may interact with (e.g., by adding to or modifying) documents, files, and/or records and may also make other changes or additions to nodes in the system. A process may then identify what other users may be interested in such interaction and why. For example, a score may be associated with the interaction and other users based on factors such as whether the users have linked to the document, file or record and/or the node the interaction may apply to. Interacting users, identified users, and interaction details may be stored in a database. Identified users may be notified of the interaction.

21 Claims, 17 Drawing Sheets

NOVEMBER 8

[1917] BIRTH EVENT ADDED TO JOHN KENNEDY'S TIMELINE BY KENNEDY1245

NOVEMBER 5

'SUMMER AT THE LAKE' ADDED TO JOHN KENNEDY'S GALLERY BY KENNEDY1245

NEW ANCESTRY RECORD HINT FOUND IN THE 1930 UNITED STATES FEDERAL CENSUS

NOVEMBER 1

[1928] MARRIAGE EVENT ADDED TO JOHN KENNEDY'S TIMELINE BY KENNEDY1245

OCTOBER 28

JIMMYK IS FOLLOWING JOHN KENNEDY. VIEW HIS FAMILY TREE OR SEND HIM A MESSAGE

KENNEDYMA SAVED JOHN KENNEDY TO HER FAMILY TREE 'KENNEDY TREE'

'SUMMER AT THE LAKE' ADDED TO JOHN KENNEDY'S GALLERY BY KENNEDY1245

ARTHUR KENNEDY LEFT A COMMENT ON 'THE KENNEDY BOYS IN NYC'

↓ VIEW MORE ACTIVITY

ABOUT ANCESTRY.COM  CONTACT US  ANCESTRY.COM BLOG  AFFILIATES
ADVERTISING  PRIVACY POLICY  TERMS AND CONDITIONS

PART OF THE GENERATIONS NETWORK  © 2008, THE GENERATIONS NETWORK, INC.

☐ ANCESTRY.COM ▾

FIG. 11 B-1

SYSTEMS AND METHODS FOR COMMUNICATION AMONG COLLABORATING USERS

BACKGROUND OF THE INVENTION

Determining relationships between individuals can be useful for a variety of reasons. For example, individuals may wish to construct family trees for religious, cultural, recreational or other reasons. In another example, an individual wishing to contact another person may try to identify people that could establish such a "link."

A person may use, for example, documents to identify relationships between people. Many documents (e.g., public genealogical documents) are now accessible using a computer and the Internet. Thus, a person may search for specific documents or documents relating to a specific person. Information from the document may be used to identify a network of related people or research, such as a family tree.

Many users may access the same record and may use the information to modify their family tree or other family history research and/or constructed networks. Though some users may be interested in how others are using the information from the same record, current systems known to the applicant do not make it possible to discover this and do not dynamically inform users of modifications to the record or modifications to other users' research based on information from the record. First, it may be difficult to identify whether an element of a first user's network is related to a specific document or identifier, especially in a system including a large number of documents, each including various combinations of information. Second, even if such relations are identified, maintaining and updating a scheme to recognize all potentially interesting modifications to representations related to a person identified in a document is difficult, particularly in light of the fact that users may be able to add and remove network elements in such representations. Third, particular modifications may be uninteresting to a user; for example, the user may have already been alerted of a similar modification or may not be interested in information associated with the modification. Sending too much information about modifications to a user may, in fact, be counterproductive, overburdening the system or making it difficult for the user to recognize the potentially interesting information. Fourth, even tracking all such modifications on a system may be difficult. Fifth, users making such modifications may not wish to have the modifications publicized and may wish that their account information and modifications be kept private.

BRIEF SUMMARY OF THE INVENTION

Embodiments of the present invention provide a method of building a representation of related individuals. The method includes providing a database comprising records, each record including identifying information relating to an individual; providing a set of users with access to the database using a computer system; allowing a first user of the set of users to interact with a first record page via the computer system, the interaction including one of more of: modifying the first record page based on input from the first user; modifying or adding a node in a first set of user-created nodes in an account of the first user based at least partly on identifying information from the first record page; and modifying a setting of the account of the first user to save data related to the first record page; identifying a subset of the set of users based at least partly on an existing or predicted relationship of the subset of users' accounts to the first record page; and providing a notification to the subset of users related to the interaction.

In some embodiments, identifying the subset comprises generating a score related to the potential relevance of the interaction to each of the set of users. Identifying the subset may include comparing the score to a threshold score. The method may include relating an account component for each user of the subset to the interaction. The account component for at least some of the subset users may include a previously defined relationship between the at least some of the subset users and the first record page. The method may include creating a second database including the identified subset of users, each user being associated with the interaction; receiving search queries comprising an identifier for at least one of the subset of users; searching the database for interactions associated with the at least one user; and providing search results related to the interactions associated with at least one user. The notification may include updating websites associated with the subset of users' accounts.

Other embodiments provide a system for building a representation of related individuals. The system includes a storage medium storing a database including records, each record including identifying information relating to an individual; and a processor programmed to: provide a set of users with access to the database using a computer system; allow a first user of the set of users to interact with a first record page via the computer system, the interaction including one of more of: modifying the first record page based on input from the first user; modifying or adding a node in a first set of user-created nodes in an account of the first user based at least partly on identifying information from the first record page; and modifying a setting of the account of the first user to save data related to the first record page; identify a subset of the set of users based at least partly on an existing or predicted relationship of the subset of users' accounts to the first record page; and provide a notification to the subset of users related to the interaction.

In some embodiments, the processor is further configured to generate a score related to the potential relevance of the interaction to each of the set of users. The processor may be further configured to compare the score to a threshold score. The processor may be further configured to relate an account component for each user of the subset to the interaction. The account component for at least some of the subset users may include a previously defined relationship between the at least some of the subset users and the first record page. The processor may be further configured to: create a second database comprising the identified subset of users, each user being associated with the interaction; receive search queries comprising an identifier for at least one of the subset of users; search the database for interactions associated with the at least one user; and provide search results related to the interactions associated with at least one user. The notification may include updating websites associated with the subset of users' accounts.

Still other embodiments provide a computer-usable medium having computer readable instructions stored thereon for execution by a processor to perform a method. The method includes providing a database comprising records, each record including identifying information relating to an individual; providing a set of users with access to the database using a computer system; allowing a first user of the set of users to interact with the first record page via the computer system, the interaction including one of more of: modifying the first record page based on input from the first user; modifying or adding a node in a first set of user-created nodes in an account of the first user based at least partly on identifying information from the first record page; and modifying a setting of the account of the first user to save data related to the first record page; identifying a subset of the set of users based at least partly on an existing or predicted relationship of the subset of users' accounts to the first record page; and providing a notification to the subset of users related to the interaction.

In some embodiments, identifying the subset includes generating a score related to the potential relevance of the interaction to each of the set of users. Identifying the subset may include comparing the score to a threshold score. The method further comprises relating an account component for each user of the subset to the interaction. The account component for at least some of the subset users may include a previously defined relationship between the at least some of the subset users and the first record page. The method may include creating a second database comprising the identified subset of users, each user being associated with the interaction; receiving search queries including an identifier for at least one of the subset of users; searching the database for interactions associated with the at least one user; and providing search results related to the interactions associated with at least one user. The notification may include updating websites associated with the subset of users' accounts.

The tools provided by various embodiments of the invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods provided by various embodiments. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like).

BRIEF DESCRIPTION OF THE DRAWINGS

FIGS. 11A and 11B show embodiments of a webpages associated with a user account.

DETAILED DESCRIPTION OF THE INVENTION

While various aspects and features of certain embodiments have been summarized above, the following detailed description illustrates a few exemplary embodiments in further detail to enable one of skill in the art to practice such embodiments. In the following description, for the purposes of explanation, numerous specific details are set forth in order to provide a thorough understanding of the described embodiments. It will be apparent, however, to one skilled in the art that other embodiments of the present invention may be practiced without some of these specific details. In other instances, well-known structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In some embodiments, methods and systems are provided to build a representation of related subjects, groups and/or events. Such representations may include a plurality of connected nodes, each being related to a specific individual, group and/or event. In one instance, the representation includes a family tree. In some embodiments, the construction of such representation is aided by, for example, identifying nodes from other users' representations that likely correspond to the same individual, group and/or event. Such matches can (e.g., automatically) be used to, for example, identify new, conflicting or changed characteristics associated with one of the matched nodes (e.g., identifying information related to an individual, group or event represented by the node and/or connections between the node and other nodes). One or more users (e.g., users associated with accounts having one of the matched nodes) may be notified of the new, conflicting or changed characteristics. The new, conflicting or changed characteristics associated with one of the matched nodes may be used to update node characteristics associated with another of the matched nodes. Further, a user may be notified when other users have interacted with a record, document, node, and/or representation that may be of interest to the user. For example, if one of the nodes of the user corresponds to an individual identified in a record, knowing that another user commented on the record may be useful in building the tree.

Figure 1:
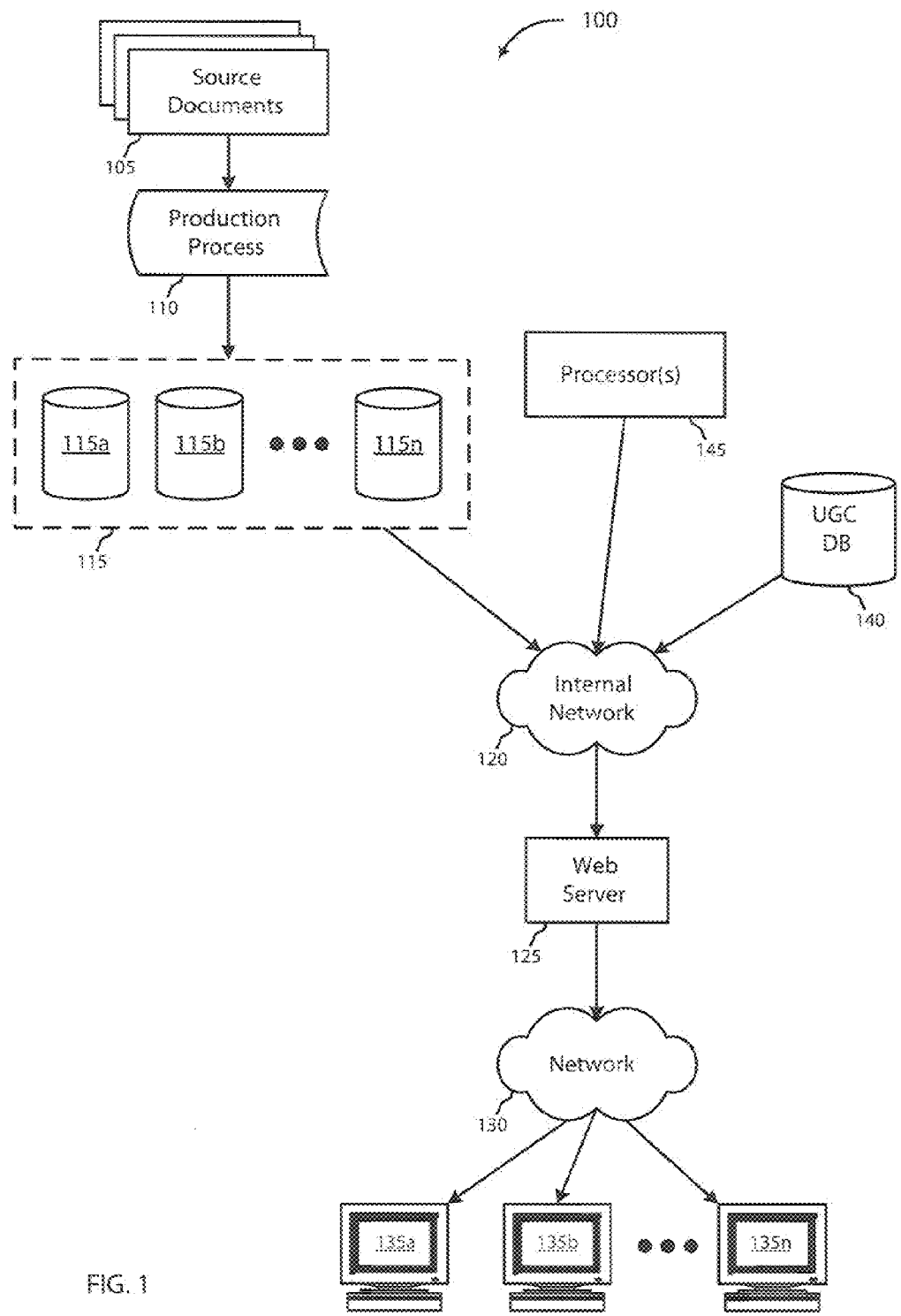
FIG. 1 shows an embodiment of a system configured to build a representation of related subjects.
Figure 2:
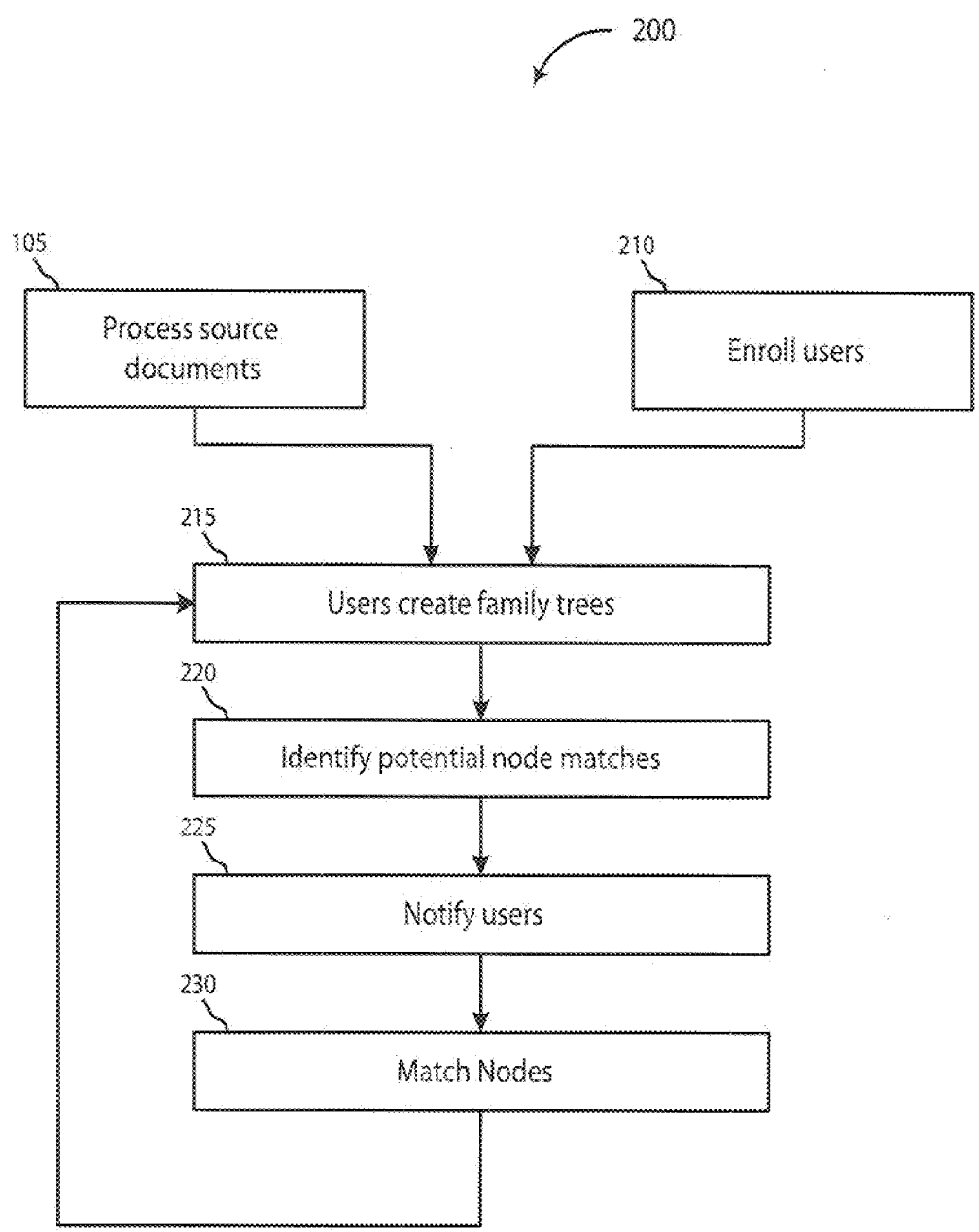
FIG. 2 shows an embodiment of a method for building a representation of related subjects.

FIG. 1 shows an embodiment of a system 100 configured to build a representation of related subjects, and FIG. 2 shows an embodiment of a method 200 for building a representation of related subjects. A subject may include an individual, a group and/or an event. At step 205, source documents 105 are processed. Source documents 105 may comprise documents, for example, relating to the identity and/or genealogical information associated with a particular subject. Documents 105 could include birth, marriage, death, tax, property, draft registration, motor vehicle, school, burial and/or court documents. Documents 105 may comprise government documents, such as U.S. censuses. Documents 105 may include lists of names. Documents 105 may include photographs and/or news articles. Documents 105 may include business-related information, such as information related to the finances and/or structure of companies. In some embodiments, documents 105 include web documents, websites and/or web articles. In some embodiments, documents 105 include paper documents. Documents 105 may all be issued by a single source (e.g., the government) or from multiple sources. Documents 105 may all be of the same format or may be of different formats. Documents 105 may include a single type of document (e.g., government records) or may include a plurality of document types.

Documents 105 may be processed by, for example, creating digital versions of documents 105. For example, paper documents may be scanned into a system. In some instances, specific information is extracted from documents 105. For example, documents may be associated with one or more individuals, one or more dates, one or more time periods, one or more locations, and/or one or more events. Documents 105 and/or digital versions of documents 105 may be compressed, have their formats changed, or altered (e.g., to improve image quality). In some embodiments, all processed documents or all processed documents to be included in a single database are of the same format. In other embodiments, they are not.

In some embodiments, a production process 110 is used to produce one or more databases 115. In one embodiment, database 115 includes a plurality of processed documents. For example, database 115 may include digital image of source documents 105. The database may be searchable. For example, a user may input an identifier, a name, a date, a time period, a location and/or an event to find processed source documents associated with the search terms. In some instances, database 115 includes links (e.g., web links) to other documents. Database 115 may include a census-type database. Database 115 may include a family-tree database and/or a world family tree database.

In some embodiments, data is stored as individual records. Records may include persona records, relationship records, and the like. For example, documents 105 and/or data therein may be processed at step 205 to evaluate the documents 105 and/or data and/or to standardize (or normalize) their formats. Thus, a record can include data and/or information from a plurality of documents 105. In some embodiments, data used in record creation is selectively chosen and/or weighted, e.g., based on the date and/or source of associated documents 105. Each record may include one or more documents and/or may include data from one or more documents. In one instance, each record includes identifying information (e.g., name, birth date, birth place, death date, and/or death place) about a subject and may be associated with, linked to, and/or connected with a "node." In some cases, nodes and/or records in database 115 are connected to each other, indicating, for example, a type of relationship between subjects associated with the nodes and/or records. In some embodiments, different databases 115 store different kinds of information. For example, one database 115 may include identifying information about a subject (e.g., an individual) and another may store other information, such as career information or stories. Information regarding (e.g., personal) relationships between subjects associated with records may be stored in the same or in a different database 115 than the database 115 storing identifying information. A record may include an overview related to events, accomplishments, positions held by, and/or people associated with a subject associated with a record. The record may include facts and sources, the facts indicating, for example, identifying information associated with the subject, and the source identifying sources (e.g., specific processed documents) from which the facts were obtained. The record may include one or more pictures associated with the subject of the record. The pictures may be stored in a gallery. The record may include comments; such comments may be added by users who have viewed, interacted with, added to, and/or connected to the record. The record may also include a community interaction list. The community interaction may identify all or specific interaction by users. For example, it may identify interactions within a specific date range, particular types of interactions, and/or interactions of interest to specific users. Different components of the record may be displayed to a user on one or more webpages. For example, different webpages, frames, and/or tabs may be associated with an overview, facts and sources, a gallery, comments, and community interactions associated with a record subject. In some embodiments, webpage displays associated with a record are at least partly controlled by account characteristics and/or user settings. For example, a user may identify a date range, and community interactions that occurred within that date range may then be displayed on a web page. A record page may be displayed differently for users; for example, a different webpage display may be presented to users who have accounts associated with a subject of the record as compared to other users.

Databases 115 may be stored on one or more computer systems. The computer system may include an internal network 120. Internal network 120 may, for example, connect a plurality of computer, such a processor 145, a web server 125, a storage system, and/or data input devices (e.g., a scanner). The web server 125 may connect the computer system to a network 130, such as the World-Wide web. Thus, in some embodiments, users may use user computers 135 to access part or all of the information stored in databases 115. In some embodiments, databases 115 may be modified by user input received over network 130, whereas in others, they cannot be modified by such user input. In some embodiments, input from users may be organized into a user-generated-content database 140. User-generated-content database 140 may include characterization of processed documents and/or data from databases 115. User-generated-content database may include personal pages, records and/or nodes, which may be associated with one or more individuals, groups or companies. User-generated-content database 140 may include pointers and/or links to processed source documents and/or data from databases 115. In some instances, user-generated-content database 140 may include text, comments, and/or reviews from user input. Content from the user-generated-content database 140 may be organized based on the date of the content addition, frequency of visits to the content from other users, categorizations of the content, and/or any other appropriate organization technique.

At step 210, users may be enrolled. The users may be enrolled, for example, by receiving user input over network 125. Enrollment may comprise receiving user identifying information (e.g., a user's name, address, telephone number, and/or email address), user billing information (e.g., credit card information), a requested user login name, and/or a password. In some embodiments, enrollment includes charging a fee (e.g., to a user's credit card). Successful enrollment may result in creating an account for the user, allowing the user to access one or more databases 115 and/or 140, allowing the user to interact with other users, and/or allowing the user to access one or more websites (e.g., made accessible over network 130 via the web server 125). In some embodiments, user input may be received requesting a certain account type or account feature/s.

At step 215, users create a family tree. In some embodiments, rather than creating a family tree, a representation of related subjects is created. The representation may relate to a family, an immediate family, an extended family, a social network (e.g., a group of friends), a professional network (e.g., a group of professional individuals) and/or companies. In some instances, the representation comprises a family tree. While in some embodiments, related subjects are related by a familial relationship and/or by blood, in others they are not. For example, the individuals may be related because they knew each other, formed a specific type of relationship (e.g., online), or shared a common experience (e.g., went to the same school). The representation may include a computer-based representation.

The representation may include individual nodes representing, for example, specific subjects. Creation of a representation of related subjects may comprise identifying one's self as one subject in the representation. Each node may be associated with particular (e.g., identifying) information relating to one or more subjects, and the node may further include information and/or links to particular processed documents, records and/or groups associated with the one or more subjects. The particular processed documents may be documents from which identifying information about the one or more subjects was obtained; particular records may be associated with the same individual that is associated with the node. Each node may further be connected to one or more other nodes. Such connections may represent relationships. The connections may therefore specify the particular kind of relationship between two nodes. For example, the connection may indicate that individuals associated with each connected node are siblings.

A node may have a status. The status may be, for example, public (indicating that all other users may view the node and characteristics associated therewith), semi-public (indicating that only some users may view the node and characteristics associated therewith), private (indicating that other users may not generally view the node and characteristics associated therewith except by specific permissions), or hidden (indicating that no other users may view the node and characteristics associated therewith).

Users may build the representation by, for example, searching databases 115 and/or 140 (e.g., using name, date, location, and/or document-type search terms). Search results may include, for example, one or more records and/or processed documents. Users may create a node that includes node characteristics. The node characteristics may be derived from information from one or more records and/or processed documents. In some embodiments, the user may be able to add information (which may be part of the node characteristics) that will be associated with the node. The information may, for example, include information obtained by reviewing processed documents and/or from personal experience. In some embodiments, specific fields are associated with each node. A user may be provided with option of completing such fields when creating the node and/or subsequently modifying the fields. For example, when the user creates a node, he may be prompted to fill in fields such as "name", "birth date", "birth location", "wedding date", etc. Fields may also include relations to others or other possible relatives (e.g., "mother", "father", "spouse", etc.) While in some embodiments, one, more or all fields are required, in other embodiments, they are not. In some embodiments, node characteristics comprise such field data. In one instance, a user may create a node that corresponds to a subject associated with a record, is connected to connected node (e.g., that is in the same representation as the created node), and/or is related to related node (e.g., that is in a representation associated with an account from another user). The node may then include at least partly the same or similar identifying information associated with the record and/or the related node. In one embodiment, fields associated with the node may be automatically populated by associating a node with a record or with another node. In some embodiments, some or all nodes may be associated with one or more picture files.

A plurality of nodes may be connected, which, as described above, may indicate relationships between subjects associated with each of the nodes. Processed documents and/or records may provide information indicating or suggesting connections between nodes. The representation may be displayed in a diagram format. Each node may be represented by a symbol, picture and/or text. Node connections may be represented, for example, by lines and/or relative positioning of the node representations.

At step 220, potential node matches are identified. In some embodiments, potential node matches include nodes that are each associated with the same subject. In some embodiments, potential node matches include nodes that share part or all of the identifying information associated with the nodes. In some instances, potential node matches include nodes that match based on what other nodes they are connected to. Potential node matches may be identified using a variety of techniques. In one instance, nodes from a first user's account and/or from a representation of related subjects associated with the first user's accounts are compared to nodes and/or representations from other users' accounts. The other users may include, for example, all other enrolled users; enrolled users having created a representation of related subjects and/or a particular kind of representation; users who viewed a particular processed document or record; users who saved information associated with a particular processed document or record; users who have established an relationship between their account and the first user's account; users who have agreed to share at least part of the content associated with their accounts; and/or users who are in a group with the first user. In some instances, potential node matches include or exclude nodes with particular statuses. For example, it may not be possible for a potential match to a first user's node to be identified to a second hidden node.

Potential node matches may be identified by, for example, generating a score approximately a similarity between nodes and/or node characteristics. For example, when comparing two nodes, each of which represents an individual, the similarity score may increase if names associated with the nodes are the same or similar, and/or if dates (e.g., birth dates, death dates, wedding dates) and/or locations (e.g., birth locations, death locations, residence locations, work locations) are the same across the nodes. Nodes with similarity scores above a threshold may be identified as being potential matches. The threshold may be an absolute score, a percentage, or a matching number. For example, nodes may be identified as potential matches if the similarity score is above an absolute threshold score, and/or if it is within the top percentile region of calculated similarity scores. In some embodiments, potential node matches include node pairs or groups that have the (e.g., 1, 2, 3, 4, 5, etc.) highest similarity scores. For example, similarity scores may be calculated between a plurality of nodes associated with a first user's account and a plurality of nodes associated with other users' accounts. Potential node matches may include node pairs (e.g., including one node from the first user's account and another from another user's account) with the (e.g., five) highest calculated similarity scores.

In some embodiments, potential node matches are identified based on one or more node connections. The potential node matches may include nodes that are directly or indirectly connected by one or more connections. For example, a node associated with an account of the first user may be connected to a node associated with an account of another user (e.g., following one or more actions by the first user and/or by the other user); thereafter, the nodes may be matched. In another example, a node associated with an account of the first user is connected to a processed document and/or to a record. The node may then be matched to nodes associated with other users' accounts that are connected to the same document and/or record. In yet another example, a node associated with an account of the first user is connected to a second node (e.g., a node associated with an account of a second user). The node associated with the first user's account may then be matched to other nodes (e.g., a third node associated with an account of a third user) that are connected to the second node.

In some instances, connections between nodes indicate that the nodes are associated with the same or similar subjects. In other instances, such connections indicate that the nodes are associated with related subjects. For example, the connections may link nodes in a manner that establish structure in a representation of related subject (e.g., a family tree). In other instances, such connections indicate that one node from the connection may be associated with information that is potentially relevant to the other node of the connection. In some embodiments, the connection indicates may connect a node to a node, document, and/or record used to obtain information relevant to the source. In some embodiments, different types of connections are distinguishable, whereas in other embodiments, they are not. Connections may be dynamic, such that, for example, a user and/or automatic process can initiate a process to add or delete one or more connections and/or to validate the connection.

In some embodiments, matching and/or a pre-matching process (e.g., generating a similarity score, comparing node characteristics and/or identifying potential node matches) is performed automatically. Other times, input (e.g., a matching request, a matching confirmation, or a matching-process agreement) is received from one or more users before the matching or pre-matching process is performed. The user may also input specific matching or pre-matching instructions. The instructions may specify which nodes (e.g., specific nodes associated with the user's account and/or specific nodes associated with others' accounts) to consider in potential matches and/or a threshold for identifying a match. For example, the user may specify a specific node from another user to proactively connect with a node from the user's account.

In some embodiments, potential node matches are identified after a user requested that two or more representations of related subjects be merged. Thus, the user's merge action also connects the different matching nodes.

In some instances, at step 225, users are notified. For example, one or more users may be notified of potential matches identified at step 220. The users may be one or more users having accounts associated with nodes identified in the potential matches. In some embodiments, the notification may comprise an option (e.g., using a display and/or requesting user input) provided to the user to accept, confirm and/or reject one or more of the potential node matches. In some embodiments, the notification indicates that nodes identified as potential node matches at step 220 are or will be connected. The notification may be, for example, displayed on a webpage associated with an account of the user. The notification may include an indication associated with a node of a potential node match from an account of the user. For example, in a representation (e.g., a diagram, list or tree-structured representation) of related subjects, a node may be highlighted, colored or emphasized indicating a potential match. The user may be able to set account settings to automatically accept or reject the potential match or to require approval by the user. In some embodiments, step 225 is not included in method 200.

At step 230, nodes are matched. The nodes may be some or all of the nodes identified as potential node matches at step 220. Matching the nodes indicates that the nodes are or are at least partly associated with the same subject. In some embodiments, one or more users (e.g., the users with accounts associated with potential node matches) must have accepted or initiated the match before the nodes are matched. In other embodiments, the match occurs automatically. Step 225 may be performed before, after or substantially simultaneously to the performance of step 230. The match may be made by modifying a database comprising information related to nodes associated with one or more user accounts. The match may be made by modifying a database comprising information related to representation/s of related subjects associated with one or more user accounts. The match may be made by adding a link or a pointer in association with a matched node (e.g., to the other node). The match may be made by modifying an account setting and/or a code (e.g., an html code). While in some instances, matched nodes includes a pair of nodes, in other instances, matched nodes include three or more nodes. Matching the nodes may further comprise providing one or more users having accounts associated with one of the matched nodes information (e.g., account information) about another of the users having accounts associated with one of the matched nodes.

In some embodiments, node status are not changed without user input, such that, for example, nodes that are public before a match are defaulted to retain their public status after the match. However, in some instances, after nodes are matched, user input may be received that changes one or more of the matched nodes from a "public" node that is viewable and/or accessible to all or at least a group of users to a "private" node that is not. In such instances, the match may remain. However, a user associated with another of the matched nodes may not be able to receive information (e.g., changes to node characteristics associated therewith) from the private node. In some instances, one or more of the matched nodes becomes hidden or is deleted (e.g., as a result of user or input). In such instances, the match may also be deleted. One or more users affected by a changed status of a node may be notified of such changed status.

Figure 3:
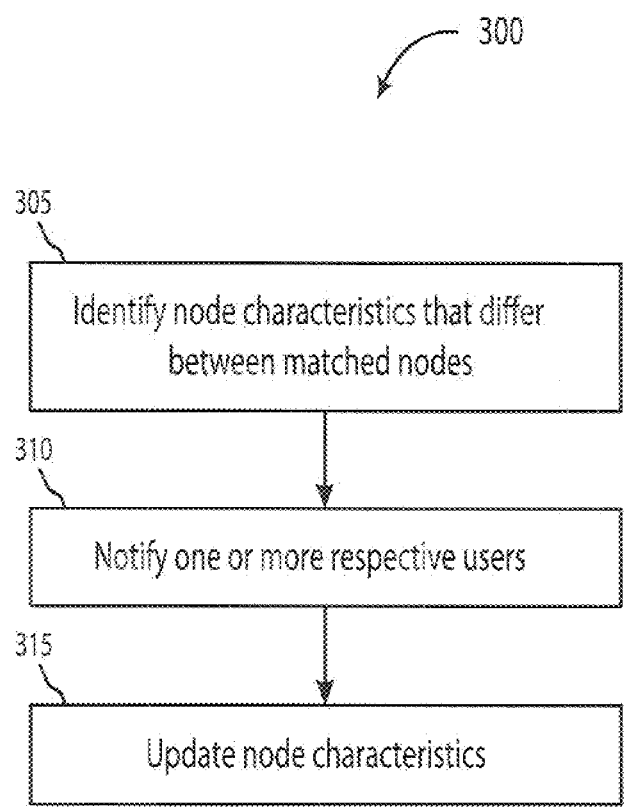
FIG. 3 shows a method for updating a node characteristic.

FIG. 3 shows a method 300 for updating a node characteristic. At step 305, node characteristics that differ between matched nodes are identified. The node characteristics may include identifying information (e.g., name, birth date, birth place, death date, and/or death place) associated with the node. The node characteristics may include connections made to/from a node (e.g., indicating a relationship to an individual, group and/or event associated with another node). The node characteristics may also include other content, such as photos, stories, or records, associated with the node. In some embodiments, step 305 comprises identifying node characteristics that are associated with one of the matched nodes but not with another of the matched nodes. In some embodiments, step 305 comprises identifying corresponding node characteristics that are different between at least two of the matched nodes. For example, though both nodes may be associated with a person by the same name, they may be associated with different birth date information.

In some embodiments, "new" node characteristics may be identified, indicating that information on a matching node is not included on the first user's node. In some embodiments "conflicting" node characteristics are identified, indicating that information on a matching node differs from similar information contained in the first user's node. In some embodiments, node characteristics are associated with information and/or events for which there is likely to be only one characteristic or occurrence (e.g., name; gender; birth date; birth place; death date; death place; spouse; marriage, engagement and/or divorce date and/or location to a specific spouse; social security number; or religious ceremonies). Thus, if two matched nodes include node characteristics identifying different information related to such data, it may be identified as conflicting. Meanwhile, other information and/or events may have multiple instances (e.g., residence, census, property, departure, arrival, destination, origin, mission, custom events, education, graduation, medical, military, ordinance, occupation, ordination, height, and weight). Thus, if two matched nodes include node characteristics identifying different information related to such likely multiple-instance characteristics, the year of the even it also taken into account and such node characteristics associated with one of the matched nodes may be identified as new (for example, if the first node did not have that event/year combination). In some instances, one matched node includes characteristics having multiple instances of a single event type (e.g., two baptisms). If another matched node includes characteristics different from those of the multiple instances, the different characteristics may be associated with one of the multiple instances or may be associated with a new instance of the event type.

In some embodiments, the differing characteristics may be identified by comparing node fields. In some embodiments, the differing characteristics may be identified by performing a search for content on the matching node within the first user's node (e.g., checking to see if a photo or record is already attached to the node or not). While in some embodiments a computer system (e.g., a processor of the computer system) is configured to identify differing characteristics, in other embodiments, it is not. Instead, information may be presented to a user to allow the user to identify differing characteristics. For example, the user could be presented with node characteristics associated with two matched nodes, such that, for example, the display includes similar positions, formats and/or titles associated with corresponding fields.

At step 310, one or more respective users are notified about differences between matching nodes. In some embodiments, only one user is notified. Such may be the case, for example, when a node associated with an account of a first user is missing a node characteristic corresponding to a matched node associated with an account of a second user. As another example, if a first of the matched nodes has been created more recently (or is associated with a more recently created account) than another of the matched nodes, it may be that only the user associated with the first node may be notified. In some embodiments, the notified user may be a user who provided instructions to initiate method 300. In some embodiments, both or all of the users having accounts associated with the matched nodes are notified. The notification may comprise notifying one or more respective users: that node characteristics differ between the matched nodes; which nodes differ and which events or other data points differ; whether the difference is something not included on the first user's node ("new") or if it differs from what is already on that node ("conflicting"); and/or that the user(s) have the option of updating one of the matched nodes. In some embodiments, the user is notified that a matched node from another representation of related subjects is connected to a node not present in the user's representation of related subject. In some such instances, the user may be given the option to add the other node, both with the option to import or merge in information from the other representation and without that option. Method 300 may also include notifying the user when no node characteristics were identified that differed between matched nodes. In some embodiments, method 300 does not include step 310.

At step 315, depending upon the choices of the notified user one or more node characteristics are updated. The one or more node characteristics may include one or more node characteristics from one or more of the matched nodes. The one or more node characteristics may comprise at least part of the characteristics identified at step 305 to differ between the matched nodes. The update may be such to reduce or eliminate the differences identified at step 305. In some embodiments, identifying information associated with one or more of the matched nodes is changed or added. In some embodiments, a new node is added to a representation of related subjects that contains one of the matched nodes. The newly added node may be one corresponding to a node from a representation of related subjects that contains another of the matched nodes. (For example, in one instance User A's account and User B's account both include representations including nodes corresponding to the same individual, but only User B's account has the matched node connecting to another node representing the individual's brother. Thus, User A's representation may be updated to include the new node.) The newly added node may have node characteristics imported or merged in from a corresponding node from the other representation. The newly add node may be connected to the matched node from the same representation. In another embodiment, a connection is added or deleted between the matched node and another node from the same representation of related subjects. Step 315 may be performed before, after or substantially simultaneously to step 310.

Method 300 may be performed, for example, after a new node match is made and/or a new potential node match is identified. Method 300 may be performed, for example, at regular intervals and/or at specific times. Method 300 may be performed following a user request to identify differing node characteristics.

Figure 4:
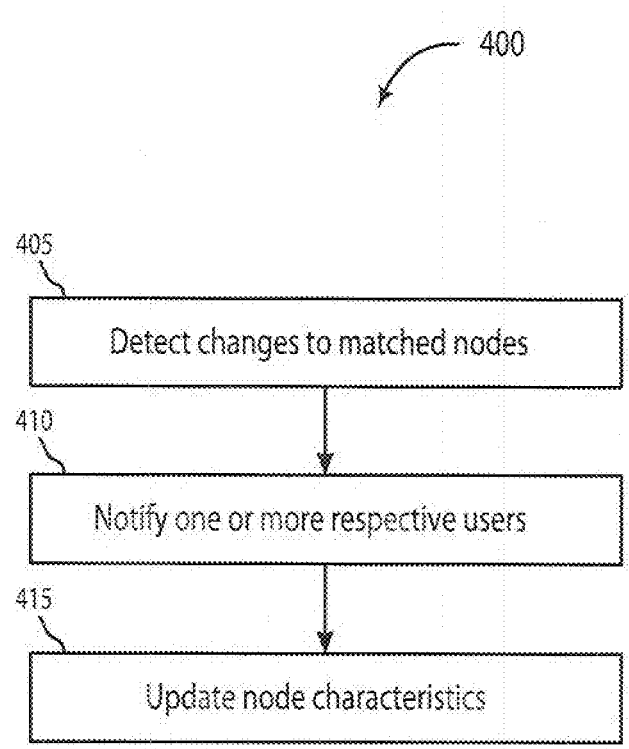
FIG. 4 shows a method for updating a node characteristic.

FIG. 4 shows a method 400 for updating a node characteristic. At step 405, changes to matched nodes are detected. Such changes may include changes to identifying information associated with the node, associated content (such as photos or records) for the node, and/or connections associated with the node. The changes may be changes initiated by a user having an account associated with one of the matched nodes (e.g., adding a connection to/from the node and/or adding, deleting or modifying identifying information associated with the node). The changes may also be changes that were automatically made when the user with the account associated with one of the matched nodes took a specific action (such as saving a record to the node). In some embodiments, the changes to a first matched node are determined by comparing node characteristics at one time point to node characteristics at another time point. In other embodiments, changes are determined by first identifying node characteristics that differ between matched nodes and then determining changes in those differences. In some instances, detecting a change to a node comprises monitoring the node. A computer system may, for example, may assess node-, account-, and/or match-related elements (e.g., node characteristics, or node differences between matched nodes) at fixed time intervals and/or fixed times (e.g., a comparing it to corresponding assessments from previous times); after a request or instruction from one or more users; or after a change to, for example, a node or account. In one embodiment, the change is detected not by comparing elements from two times, but by noting a specific change to, for example, a node or account. For example, a change to add or modify identifying information and/or a connection to be associated with a node may be detected, prompted by the specific change. In some embodiments, a computer system does not itself detect changes to a matched node. Instead, information may be presented to a user to allow the user to identify such changes. For example, the user could be presented with node characteristics associated with one of the matched nodes associated with a first time point and node characteristics associated with the same matched nodes associated with a second time point, such that, for example, the display includes similar positions, formats and/or titles associated with corresponding fields.

At step 410, one or more respective users is notified. The one or more respective users may be a user having an account associated with a node that is matched to a node that was detected as being changed at step 405. The notification may: indicate that the node was changed, identify a corresponding matched node (e.g., associated with an account of the user being notified), indicate details regarding what changed, provide a link to see and review the changes, notify the user that a corresponding matched node was changed in a similar manner, and/or provide an option to the user to change a corresponding matched node in a similar manner. This notification may also be provided to users with accounts that have been invited specifically to the node for which the change was made. Method 400 may also include notifying a user when no changes to matched nodes are detected. In some embodiments, method 400 does not include step 410.

At step 415, one or more node characteristics are updated based upon choices made by a user after being notified about changes to a matching node. The update may be such to increase the similarities of node characteristics between the node and a corresponding matched node (e.g., the node for which a change was detected at step 405). The update may comprise a change to the one or more nodes that is the same or similar to the change detected at step 405. These new changes may be detected as additional new changes at step 405 and additional users may be notified about it in like manner at step 410. Step 415 may be performed before, after or substantially simultaneously to step 410.

Figure 5:
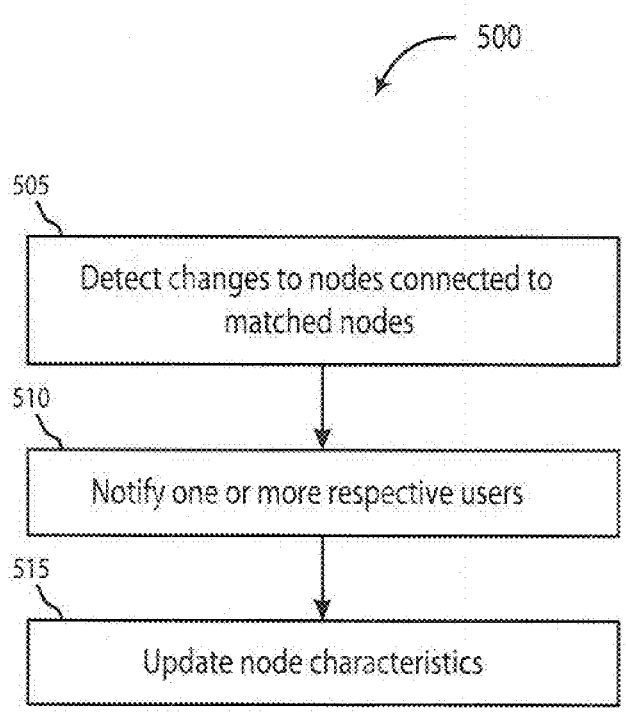
FIG. 5 shows a method for updating a node characteristic.

FIG. 5 shows a method 500 for updating a node characteristic. At step 505, changes to a node (referred to herein as Node #1) connected to a matched node (referred to herein as Node #2) are detected. Changes may include any of the changes described with regard to step 405 of method 400 and may be detected using any technique or process described with regard to step 405 of method 400. However, such changes are detected not to the matched nodes themselves but to a node connected to a matched node. For example, if a first node (Node #0) associated with User A's account is matched to a first node associated with User B's account (Node #2), a change may be detected to any of one or more second nodes (Node #1) associated with User B's account and connected to the first node associated with User B's account. In some instances, the node (Node #1) is directly connected to the matched node (Node #2). In some instances, the node (Node #1) is indirectly connected to the matched node (Node #2). In some instances, the node (Node #1) is associated with the same account as the matched node (Node #2), such as in the example above. In other instances, it is not. For example, if in the example above the change was instead detected to a first node associated with User C's account (Node #1'), where such node was connected to the first node associated with User B's account (Node #2).

In some instances, the node (Node #1) connected to the matched node is also matched to the matched node (Node #2). For example, in the previous example, such that the first node associated with User C's account (Node #1') is matched to the first node associated with User B's account (Node #2). The node (Node #1) connected to the matched node may include a node characteristic of identifying information similar to or the same as a corresponding characteristic or identifying information associated with the matched node (Node #2). The node (Node #1) connected to the matched node and the matched node (Node #2) may be associated with the same subject.

In some embodiments, the node (Node #1) connected to the matched node includes a node characteristic of identifying information different from as a corresponding characteristic or identifying information associated with the matched node (Node #2). The node (Node #1) connected to the matched node (Node #2) and the matched node (Node #2) may be associated with different subjects.

While in some embodiments a computer system (e.g., a processor of the computer system) is configured to identify differing characteristics, in other embodiments, it is not. Instead, information may be presented to a user to allow the user to identify such changes. For example, the user could be presented with (1) node characteristics associated with the node connected to the matched node, the characteristics being associated with a first time point and (2) node characteristics associated with the same node, the characteristics being associated with a second time point, such that, for example, the display includes similar positions, formats and/or titles associated with corresponding fields.

At step 510, one or more respective users is notified. The one or more respective users may comprise a user having an account associated with a second matched node (Node #0) that is matched to the matched node (Node #2) connected to the node for which changes were detected at step 505. For example, in the above example, User A may be notified. In some instances, a user having an account associated with the matched node (Node #2) connected to the node for which changes were detected at step 505 is also notified. For example, in the example above, User B may be notified. The notification may: indicate that the node was changed, identify a node matched to the matched node connecting to the node for which changes were detected (e.g., associated with an account of the user being notified), indicate details regarding what change was detected, notify the user of a change to a representation of related subjects comprising the second matched node (Node #0), and/or provide the option to the user to change a representation of related subjects comprising the second matched node (Node #0). Method 500 may also include notifying a user when no changes to a node connected to a matched node are detected. In some embodiments, method 500 does not include step 510.

At step 515, one or more node characteristics are updated. In some embodiments (e.g., when Node #1 is associated with the same subject as is associated with Node #2 and Node #0), the second matched node (Node #0) may be changed (automatically or per instructions from the user) in a manner similar to or the same as that detected at step 505. In some embodiments, a node connected to the second matched node (e.g., a node corresponding to Node #1) may be changed (automatically or per instructions from the user in a manner similar to or the same as that detected at step 505. Step 515 may be performed before, after or substantially simultaneously to step 510.

With regard to steps 310, 410 and 510 of methods 300, 400 and 500, users may be notified in any of a variety of manners. In some embodiments, the notification may comprise an option (e.g., using a display and/or requesting user input) provided to the user to accept, confirm, ignore, and/or reject one or more changes to a node characteristic, representation of related subjects and/or account settings. In some embodiments, the notification indicates that a node characteristic, representation of related subjects and/or account setting has changed. The notification may be, for example, displayed on a webpage associated with an account of the user. The notification may comprise an email message. The notification may include an indication associated with a node (e.g., involved in a change or suggested change) from an account of the user. For example, in a diagram representation of related subjects, a node may be highlighted, colored or emphasized indicating a potential match. The user may be able to set account settings to automatically accept, reject and/or ignore the potential match or to require approval by the user. In some embodiments, the user being notified may be the user having an account that has not been modified, for whom no modifications are suggested, and/or for whom no instructions initiating one or more of the described methods were received. For example, an email may be sent to the user thanking him for information or notifying him that another member has changed a node characteristic, representation of related subjects and/or account setting based at least partly on data associated with the notified user.

With regard to steps 315, 415 and 515 of methods 300, 400 and 500, the update may be performed in any of a variety of manners. The update may be automatic and/or may require user instruction before the update is performed. User instruction may be with regard to an update associated with a particular node or with an entire representation of related subjects. The user instruction may initiate a process (e.g., by requesting that changes be detected at step 405 or 505 or differences be identified at step 305) and/or the instruction may initiate an update after the process was already initiated. In some embodiments, information is received from the user indicating that the update relate to only some of the changes detected at step 405 or 505 and/or only some of the differences identified at step 305. A webpage may be configured to receive user instruction to initiate a process and/or an update; for example, an option may be available on a webpage associated with a node, such that a user selection of the option indicates a request that a change be detected (e.g., in step 405 or 505) or differences be identified (e.g., in step 303). In some instances, merely clicking on a node link (before arriving at a node-specific page) may be sufficient to initiate a process and/or an update. The update may include modifying a database comprising information related to nodes associated with one or more user accounts and/or a database comprising information related to representation/s of related subjects associated with one or more user accounts. The update may include modifying an account setting and/or a code (e.g., an html code). In some embodiments, steps 315, 415 or 515 are not included in the respective methods 300, 400 or 500.

Figure 6:
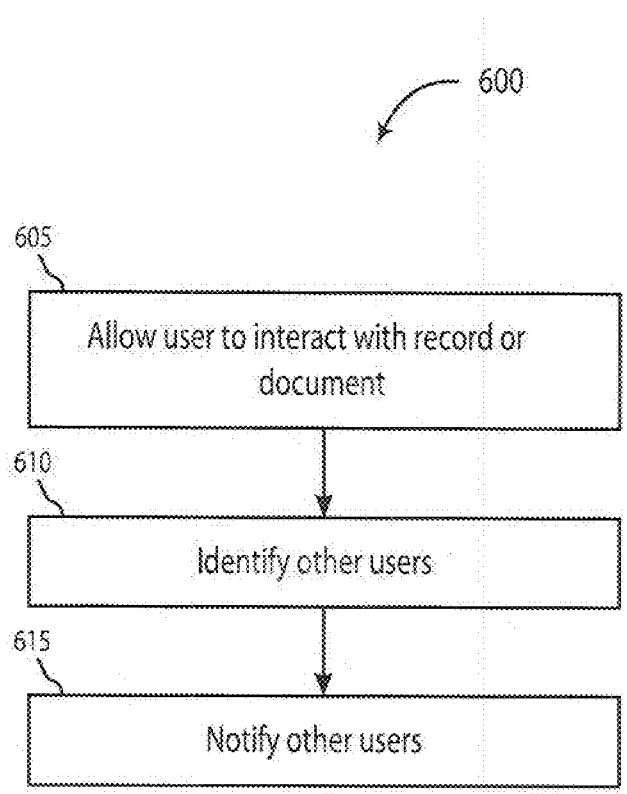
FIG. 6 shows a method for notifying a user of potentially relevant actions related to a representation of related subjects.

FIG. 6 shows a method 600 for notifying a user of potentially relevant actions related to a representation of related subjects. At step 605, a user is allowed to interact with a record or document (e.g., a processed document), including content shared by other members (such as photos). The interaction may comprise, for example, modifying or adding information to the record or document. The modification may include revising, correcting, adding to, or deleting information from the record or document. The modification may include adding a comment on other information from the record or document or posting a review. The interaction may comprise modifying or adding a node to a set of nodes and/or to a representation of related subjects (e.g., associated with an account of the individual) based at least partly on information (e.g., identifying information, connections or suggested connections) from the record or document. The modification may include, for example, adding (or merging) similar or the same information to be associated with the node as from the record or document. The modification may also include simply associating the record or document to a node for a subject to which the record pertains. In some instances, such modification or addition can be performed automatically. An account setting may indicate whether such modifications or additions are to be performed automatically. In some instances, such modification or addition is only performed following specific user instruction (e.g., by receiving a user button click on a record page or by receiving an input comprising an identifier of a record page in a field on a webpage associated with an account). The interaction may include modifying a setting of an account of the user to save data related to the record or document. In some instances, a file (e.g., a text file, an image file, or a pdf document) is saved. In some instances, a link or pointer to the record, document or account is created.

At step 610 other users are identified. The other users may be identified based at least partly on an existing or predicted relationship to the record or document. For example, the other users may have a connection to the record or document (e.g., from a node associated with their accounts). The other users may be identified based on whether they requested to be identified upon such interactions with the record or document. The other users may be ones who have previously interacted with the same record or document. The other users may be identified based on the specific type of interaction that occurred. For example, they could be identified as users having nodes associated with information that is similar to or the same as information added to a record.

Identifying the other users may comprise monitoring one or more records, documents, accounts and/or databases. Identifying the other users may comprise generating a score related to a potential relevance of an interaction to each of a set of users. The score may be generated based on one or more of: the type of interaction; content added in the interaction; the extent of the interaction; the date of the interaction, a relationship between the user performing the interaction and other users; a previous interaction between each of the set of users and the record, document or account; and an account setting of each of the set of users. In some embodiments, the score relates to a reason why a user might care about the interaction. For example, different points may be assigned for situations where an account of the user is associated with a node having node characteristics that could be changed by the interaction, where the user created the record or document, where the user frequently visits the record or document, and/or where the user has requested to be updated on the record or document. Identifying the other users may comprise comparing a generated score to a threshold.

At step 615 the other users are notified about the interactions with the record or document. In some embodiments, notifications may be performed in manners discussed above with respect to steps 310, 410 or 510 or methods 300, 400 or 500. For example, the notification may include a display characteristic associated with an account-related webpage. The notification may include updating a website, an account setting, a representation of related subjects, a node, and/or a node characteristic. The notification may indicate, for example, the type of interaction, the user who made the interaction, the date of the interaction, the record or document interacted with, a link to a representation of related subjects associated with the user who made the interaction, and/or possible response options to the interaction. Method 600 may also include notifying the other users when no interactions with a record or document have been identified.

In some embodiments, the record or document or a webpage associated therewith is also modified. For example, a webpage displaying information about a record or document may be modified to indicate that a change was made, by whom, when and/or with a link to a representation of related subjects associated with the user who made the change. In some embodiments, step 615 is not included in method 600.

In some embodiments, a database or database component includes a list of users and interactions of users with one or more records or documents. The listed users may be users that have, for example, interacted with and/or connected to one or more particular records or documents. The listed users may be ones that have a defined relationship and/or those who are predicted to have a relationship with one or more particular records or documents. The database may comprise links to representations of related subjects associated with users listed on the database. The database may comprise a list or indication of changes that have been made to the one or more records or documents. The database may be searchable. For example, search terms related to an identity of a particular user, search terms related to a particular kind of interaction with one or more records or documents, and/or search terms related to an identity of a particular document or record may be received, and corresponding search results may be provided. In some instances, the database includes the other users identified at step 610 of method 600. In some instances, other users identified at step 610 are added to the database. The database may also include additional information and/or links to representations of related subjects associated with accounts of users listed in the database. In some instances, the search results may thus display information about a particular user, such as specific interactions that the user had with various documents and/or records; representations of related subjects created and/or modified by the individual; and/or other account information. In other instances, the search results may display information about a particular document or record, such as which user saved the record, which users made corrections and/or comments, and/or when such actions were performed.

Figure 7A:
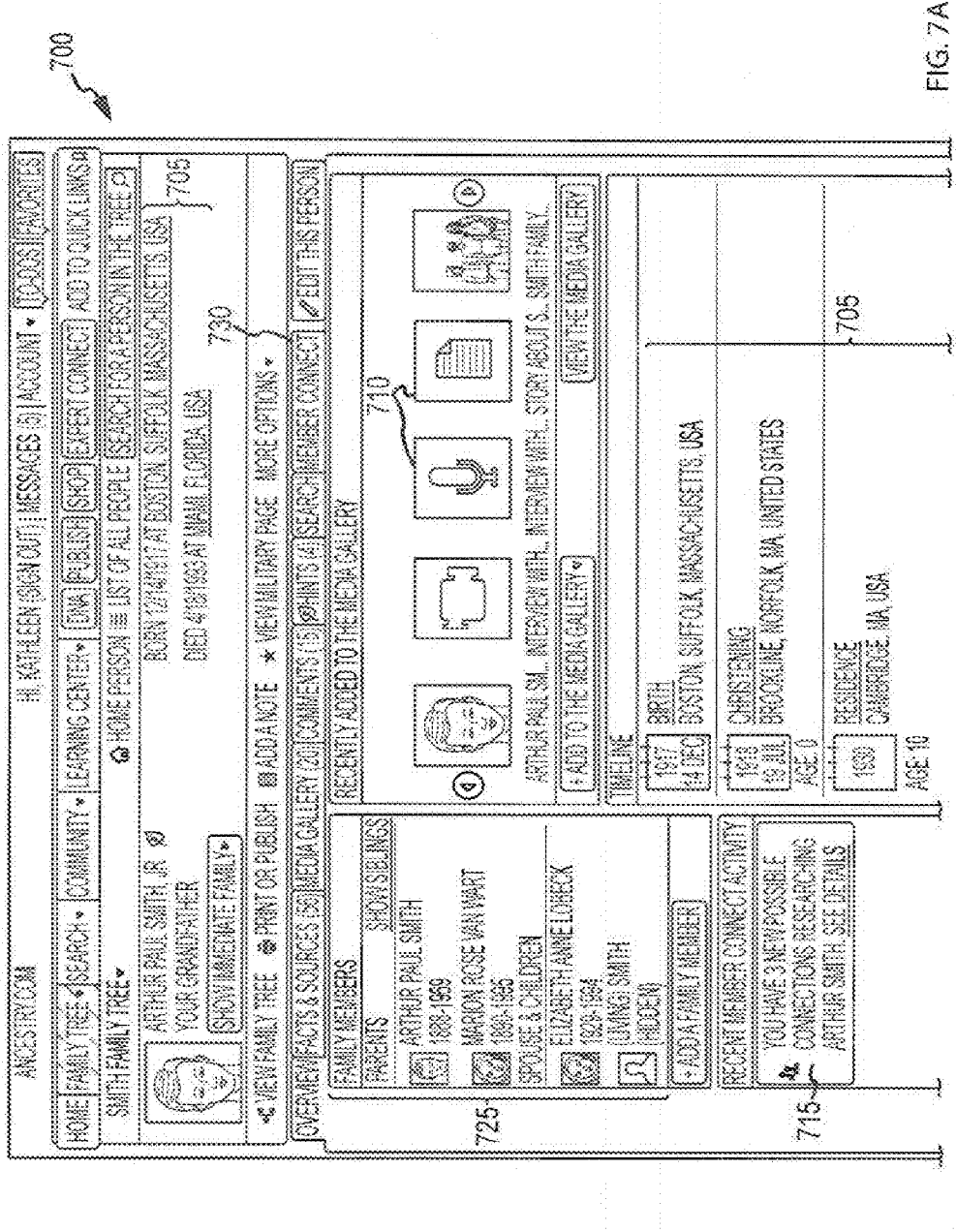
FIGS. 7A and 7B show embodiments of webpages associated with a nodes.
Figures 1, 7A:
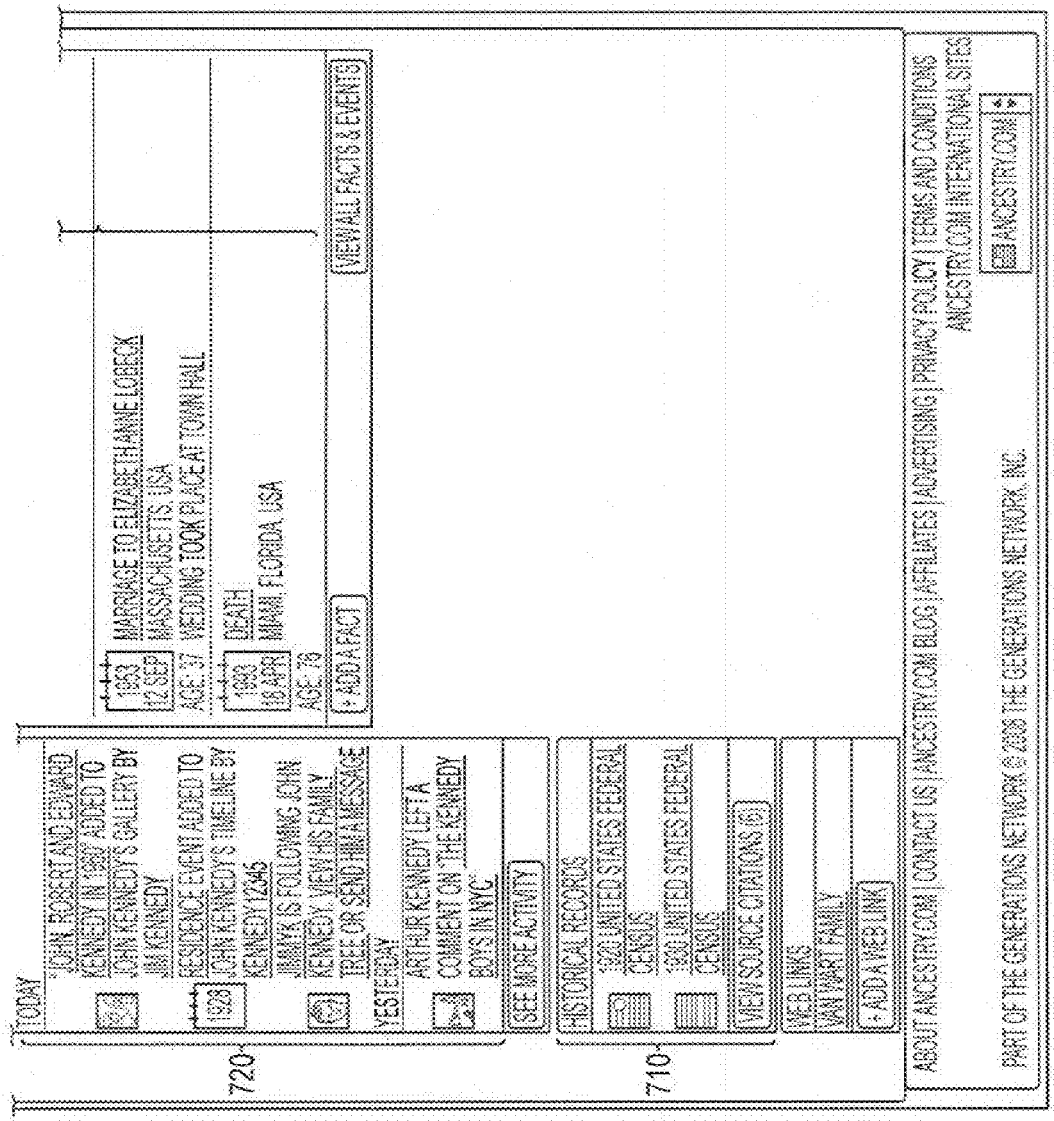

FIG. 7A shows one embodiment of webpage 700 associated with a node. The node in this instance is associated with a particular subject (in this case, an individual) and includes identifying information 705, such as the individual's birth date, marriage date, residence, etc. The node page also includes links 710 to files related to the individual (e.g., picture files, video files, sound files, text files, etc.). In this case, the node corresponds to a record associated with the particular individual. The page shows connections 725 to other nodes related (by family relationships) to the node in question. The page also shows suggested "possible connections" 715 which may have been identified, for example, using the method by matching the user's node to other users' nodes and comparing connections. The page shows actions 720 related to the node (e.g., interactions with an associated record page) performed by other users (e.g., with accounts associated with matched nodes).

Figure 7B:

FIG. 7B shows one embodiment of a webpage 750 associated with a node. The page is located by following the member connect tab 730 and the suggested connections button 755. The page notifies a user that others may be working on the same node and what they are doing.

Figure 8:
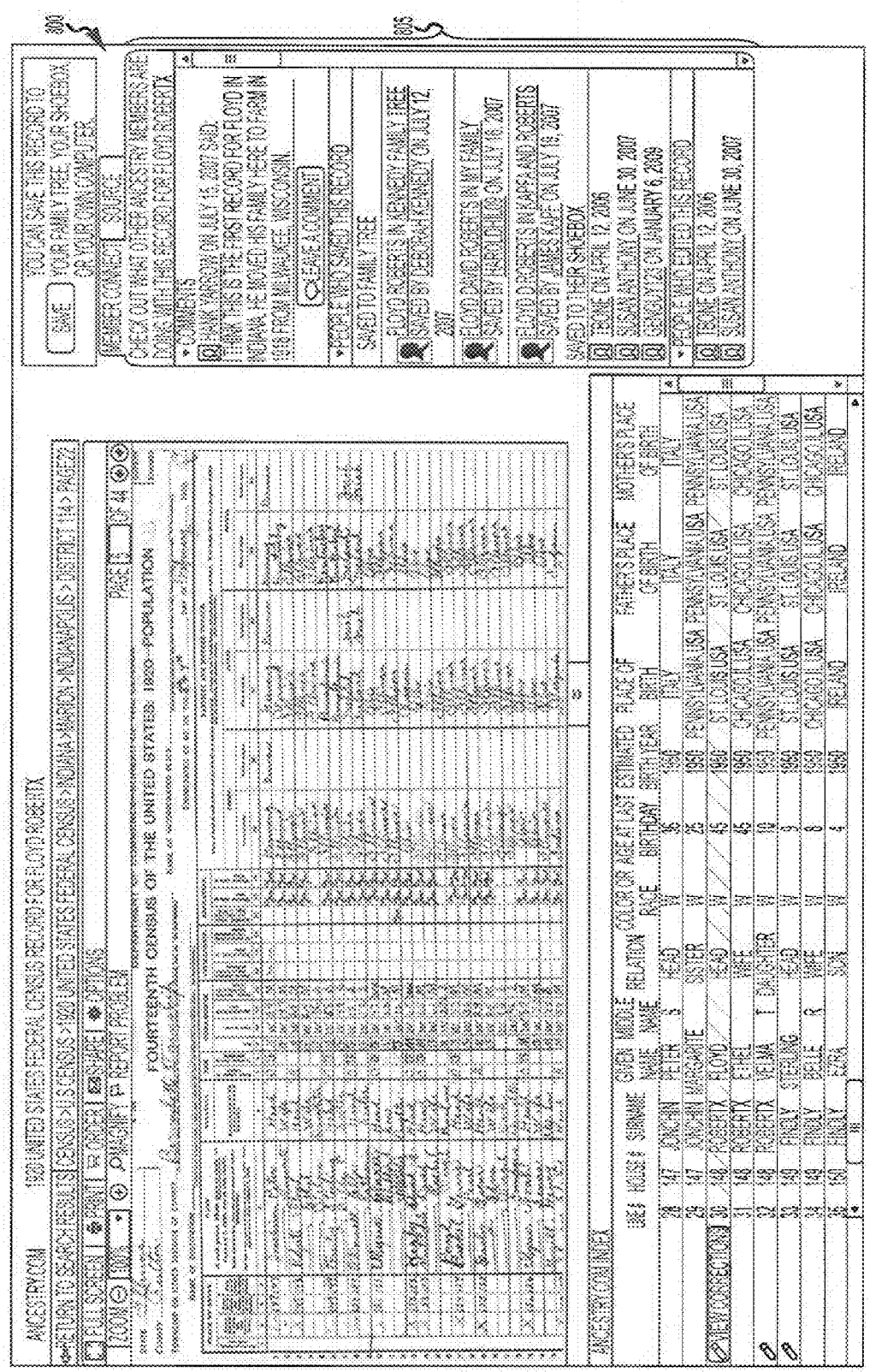
FIG. 8 shows one embodiment of a webpage associated with a record.

FIG. 8 shows one embodiment of a webpage 800 associated with a record. The record includes similar identifying information associated with a subject (in this case, an individual) but is not yet integrated into a representation of related subjects. The record page shows member activity 805 indicating other users' interactions with the same page. Such member activity 805 may be restricted to users with a particular relationship to the user viewing the page or may include all users.

Figure 9:
FIG. 9 shows one embodiment of a webpage associated with a record.

FIG. 9 shows one embodiment of a webpage 900 associated with notifications about changes made around a set of nodes and/or records that a specific user may be interested in. The shown webpage includes indications 905 of the specific related user interactions or changes. In this instance, the type of interactions, the date of the interactions, users who initiated the interactions, and links to pages associated with the user accounts and/or representations of related subjects are provided. The shown webpage also shows user options 910 that can customize the "feed" or a list and/or description of these notifications. For example, a user may select to limit the shown interactions to interactions that add new content to the website, that have saved content from the website (e.g. to an account), that include new facts and sources added for a node, that add a new related node, that include comments on records or nodes, and/or relate to content associated with the user's account.

Figure 10:
FIG. 10 shows one embodiment of a webpage associated with a first matched node.

FIG. 10 shows one embodiment of a webpage 1000 associated with a first of matched nodes. The page shows node characteristics 1005 associated with a second of the matched nodes, the second node being matched to the first node. The webpage may be configured to receive input (via a link 1010 or button) from the user to allow a comparison between characteristics associated with the first and second nodes. The webpage may identify specific displayed node characteristics associated with the second node that is conflicting with node characteristics associated with the first node, and/or the webpage may identifying specific displayed node characteristics associated with the second matched node that is not present in node characteristics associated with the first matched node. These characteristics may have a flag 1015 (e.g., the "New" or "Conflicting" flags shown in FIG. 10) next to the characteristic, may be displayed in a different color, may be displayed in a different format, and/or may be displayed in a different font. The page may also provide options for the user to import characteristics from the second node to be associated with the first node, such that it, for example, resolves or reduces conflicting characteristics and/or adds otherwise "missing" characteristics to the first matched node's characteristics. The webpage may also be configured to receive user input to ignore one or more of such identified conflicts or new characteristics. The webpage may be configured to display a relationship between users associated with matched nodes. The webpage may be configured to receive input from a user to remove a match between the matched nodes.

Figure 11A:
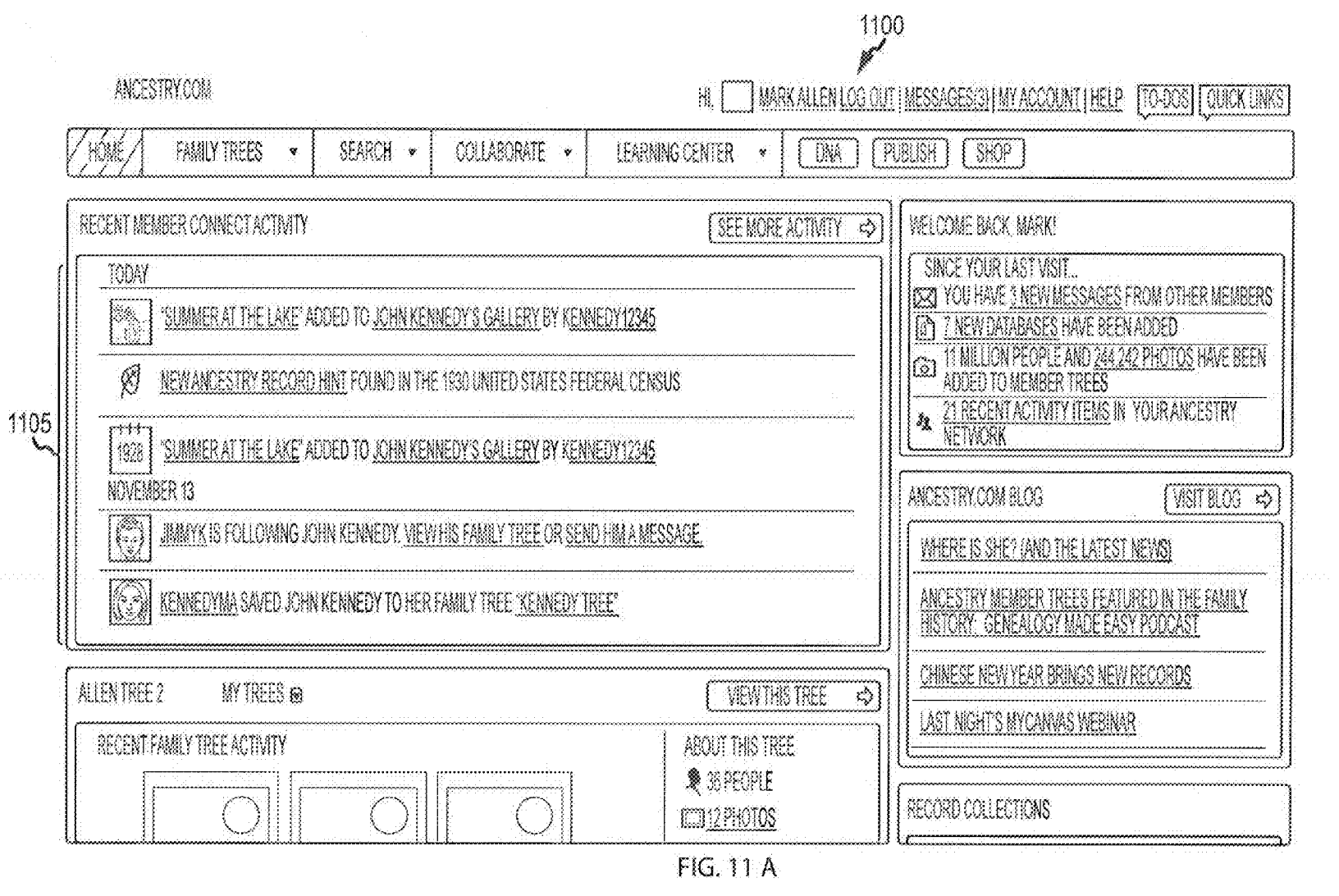

FIG. 11A shows one embodiment of a webpage 1100 associated with a user account. The webpage includes a plurality of notifications 1105. The notifications relate to user activity associated with or interactions relating to matched nodes; activity related to a representation of related subjects created by the individual and/or content added by the individual; and/or activity on or interactions with records or documents saved, edited, or commented on by the user. In this instance, the type of interactions, the date of the interactions, users who initiated the interactions, and links to pages associated with the user accounts and/or representations of related subjects are provided. User input may be received to customize displayed notifications. For example, the user may indicate: a date range of actions relating to notifications to display; a number of notifications to display; and/or set relevancy criteria and/or a relevancy threshold for what type of notifications are displayed.

Specific notifications may be displayed to a user based at least partly on a relevance evaluation. The relevance evaluation may include providing a relevancy score or assessment for each of a plurality of notifications. The score or assessment may depend on, in an example related to record- or document-based notifications: how recently the user interacted with the record or document, a type of another user's interaction with the record or document, and/or the date of the other user's interaction with the record or document. The score or assessment may depend on, in an example related to a node-based notification, if the user is an editor or owner of a representation including the node, how close (e.g., how many generations away) the node is from a node associated with the user; how recently the user edited the node; the type of another user's interaction with the node, and/or the date of the other user's interaction with the node. Users may be provided with various tools to adjust what notifications they see based on the relevance scoring, such as those depicted in FIG. 11B.

Figure 11B:
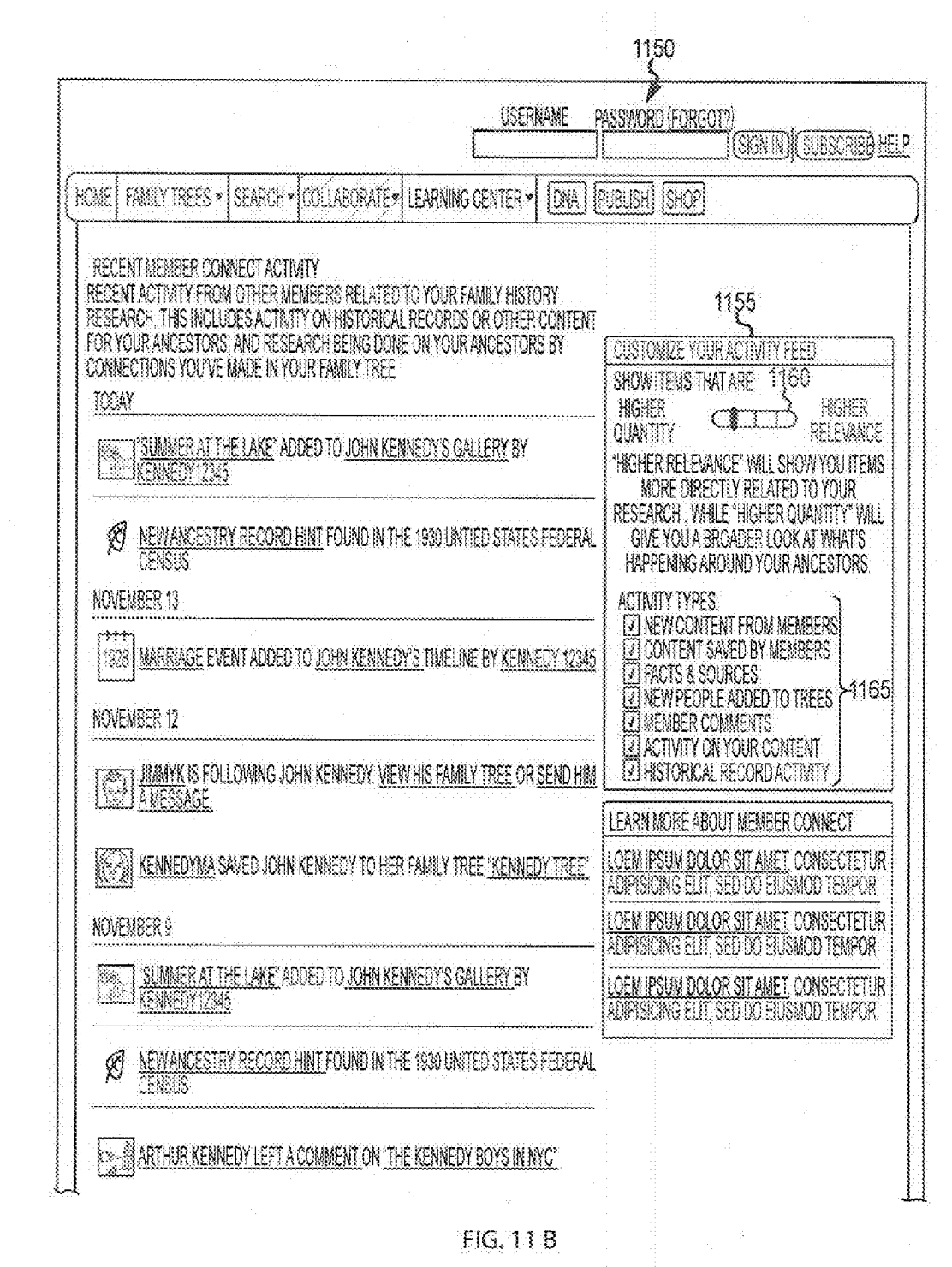

FIG. 11B shoes a web page 1150, which includes tools users may use to customize their feeds. A toobox 115 includes a slider control 1160 to select more or less feed information. It also includes check boxes 1165 for selecting specific types of feed information.

FIGS. 2-6 illustrate various methods that can be used to build a representation of related subjects, update a node characteristic, and/or notify a user of potentially relevant actions. While the methods of FIGS. 2-6 are illustrated, for ease of description, as different methods, it should be appreciated that the various techniques and procedures of these methods can be combined in any suitable fashion, and that, in some embodiments, the methods depicted by FIGS. 2-6 can be considered interoperable and/or as portions of a single method. Moreover, while the methods illustrated by FIGS. 2-6 can be implemented by (and, in some cases, are described below with respect to) the system 100 of FIG. 1 (or components thereof), these methods can be implemented using any suitable hardware implementation. Similarly, while the system 100 of FIG. 1 (and/or components thereof) can operate according to the methods illustrated by FIGS. 2-6 (e.g., by executing instructions embodied on a computer readable medium), the system 100 can also operate according to other modes of operation and/or perform other suitable procedures.

Figure 12:
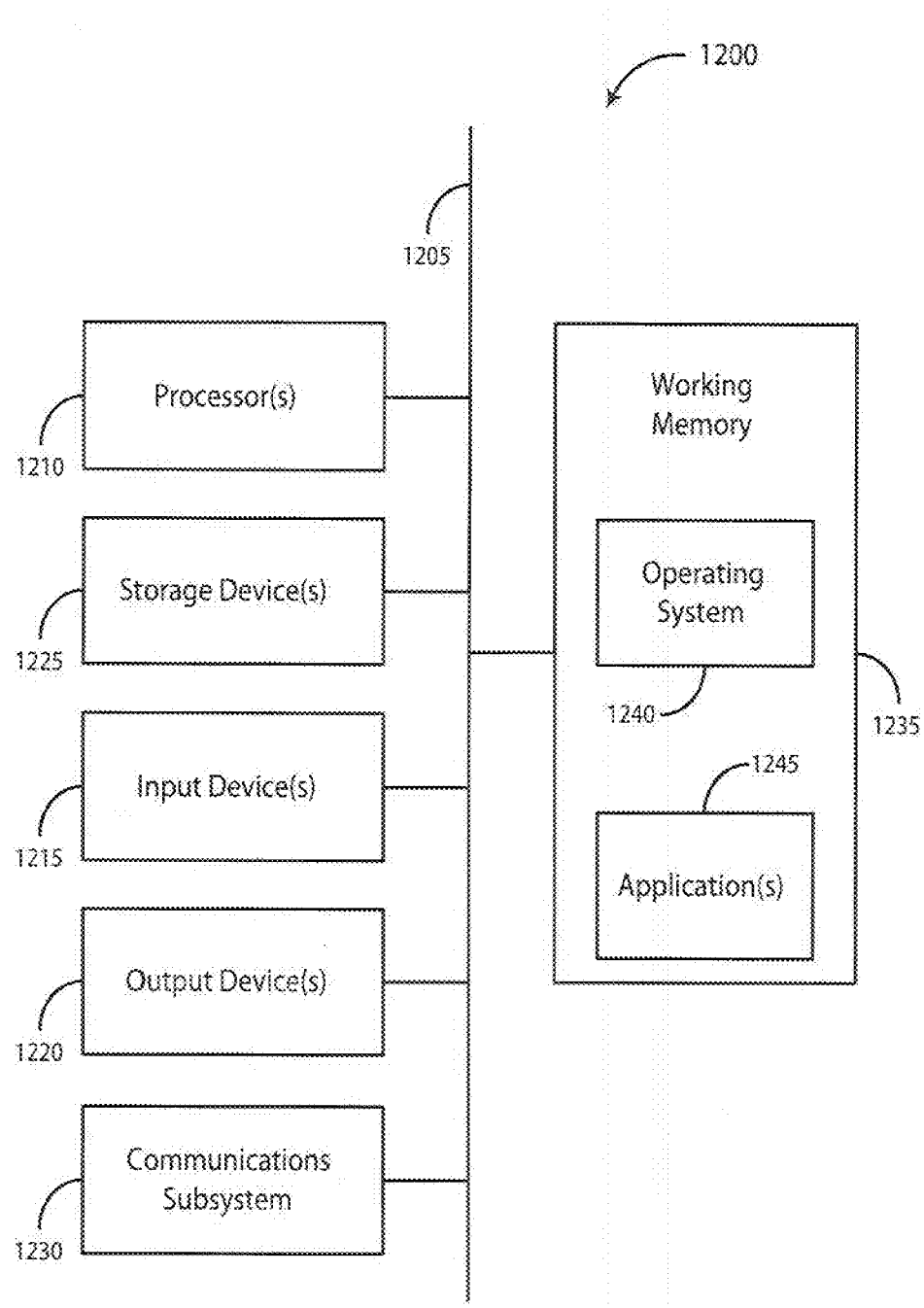
FIG. 12 shows a generalized schematic diagram illustrating a computer system, in accordance with various embodiments of the invention.

FIG. 12 provides a schematic illustration of one embodiment of a computer system 1200 that can perform the methods provided by various other embodiments, as described herein, and/or can function to aid in the building of representation of related subjects. The computer system 1200 may be used, for example, with regards to system 100. The computer system 1200 may, for example, receive user input to allow users to, for example, create accounts, access and/or modify databases, and/or create representations of related subjects. The computer system 1200 may notify users of other users' interactions with records, documents, nodes, and/or representations of related subjects. The computer system 1200 may store changes associated with representations of related subjects. The computer system 1200 may determine potential node matches, may match nodes, may identify differences in node characteristics, and/or may update node characteristics. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computer system 1200 is shown comprising hardware elements that can be electrically coupled via a bus 1205 (or may otherwise be in communication, as appropriate). The hardware elements may include one or more processors 1210, including without limitation one or more general-purpose processors and/or one or more special-purpose processors (such as digital signal processing chips, graphics acceleration processors, and/or the like); one or more input devices 1215, which can include without limitation a mouse, a keyboard and/or the like; and one or more output devices 1220, which can include without limitation a display device, a printer and/or the like.

The computer system 1200 may further include (and/or be in communication with) one or more storage devices 1225, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1200 might also include a communications subsystem 1230, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 1230 may permit data to be exchanged with a network (such as the network described below, to name one example), other computer systems, and/or any other devices described herein. In many embodiments, the computer system 1200 will further comprise a working memory 1235, which can include a RAM or ROM device, as described above.

The computer system 1200 also can comprise software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer readable storage medium, such as the storage device(s) 1225 described above. In some cases, the storage medium might be incorporated within a computer system, such as the system 1200. In other embodiments, the storage medium might be separate from a computer system (i.e., a removable medium, such as a compact disc, etc.), and or provided in an installation package, such that the storage medium can be used to program, configure and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1200) to perform methods in accordance with various embodiments of the invention. According to a set of embodiments, some or all of the procedures of such methods are performed by the computer system 1200 in response to processor 1210 executing one or more sequences of one or more instructions (which might be incorporated into the operating system 1240 and/or other code, such as an application program 1245) contained in the working memory 1235. Such instructions may be read into the working memory 1235 from another computer readable medium, such as one or more of the storage device(s) 1225. Merely by way of example, execution of the sequences of instructions contained in the working memory 1235 might cause the processor(s) 1210 to perform one or more procedures of the methods described herein.

The terms "machine readable medium" and "computer readable medium," as used herein, refer to any medium that participates in providing data that causes a machine to operation in a specific fashion. In an embodiment implemented using the computer system 1200, various computer readable media might be involved in providing instructions/code to processor(s) 1210 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical and/or magnetic disks, such as the storage device(s) 1225. Volatile media includes, without limitation, dynamic memory, such as the working memory 1235. Transmission media includes, without limitation, coaxial cables, copper wire and fiber optics, including the wires that comprise the bus 1205, as well as the various components of the communication subsystem 1230 (and/or the media by which the communications subsystem 1230 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1200. These signals, which might be in the form of electromagnetic signals, acoustic signals, optical signals and/or the like, are all examples of carrier waves on which instructions can be encoded, in accordance with various embodiments of the invention.

The communications subsystem 1230 (and/or components thereof) generally will receive the signals, and the bus 1205 then might carry the signals (and/or the data, instructions, etc. carried by the signals) to the working memory 1235, from which the processor(s) 1205 retrieves and executes the instructions. The instructions received by the working memory 1235 may optionally be stored on a storage device 1225 either before or after execution by the processor(s) 1210.

The computer system 1200 may, for example, receive user input to allow users to, for example, create accounts, access and/or modify databases, and/or create representations of related subjects. The computer system 1200 may notify users of other users' interactions with records, documents, nodes, and/or representations of related subjects. The computer system 1200 may store changes associated with representations of related subjects. The computer system 1200 may determine potential node matches, may match nodes, may identify differences in nodes, and/or may update node characteristics.

Figure 13:
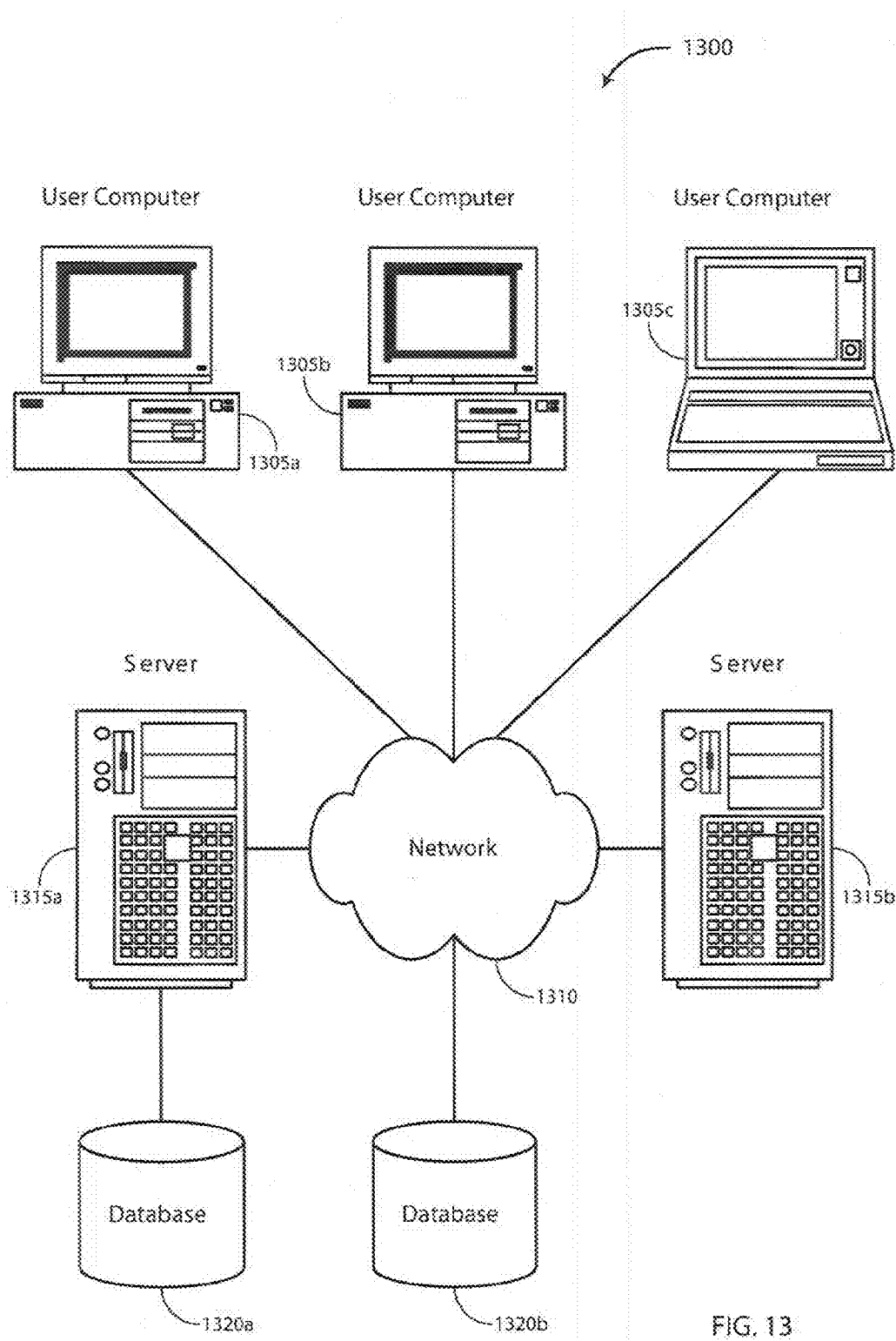
FIG. 13 shows a block diagram illustrating a networked system of computers, which can be used in accordance with various embodiments of the invention.

A set of embodiments comprises systems for building representations of related subjects; creating user accounts; allowing users to access and/or modify databases; notifying users of other users' interactions with records, documents, nodes and/or representations of related subjects; storing changes associated with representations of related subjects; determining potential node matches, matching nodes; identifying differences in node characteristics; and/or updating node characteristics. Merely by way of example, FIG. 13 illustrates a schematic diagram of a system 1300 that can be used in accordance with one set of embodiments. The system 1300 can include one or more user computers 1305. The user computers 1305 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 1305 can also have any of a variety of applications, including one or more applications configured to perform methods provided by various embodiments (as described above, for example), as well as one or more office applications, database client and/or server applications, and/or web browser applications. Alternatively, the user computers 1305 can be any other electronic device, such as a thin-client computer, Internet-enabled mobile telephone, and/or personal digital assistant, capable of communicating via a network (e.g., the network 1310 described below) and/or displaying and navigating web pages or other types of electronic documents. Although the exemplary system 1300 is shown with three user computers 1305, any number of user computers can be supported.

Certain embodiments of the invention operate in a networked environment, which can include a network 1310. The network 1310 can be any type of network familiar to those skilled in the art that can support data communications using any of a variety of commercially-available (and/or free or proprietary) protocols, including without limitation TCP/IP, SNA, IPX, AppleTalk, and the like. Merely by way of example, the network 1310 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 1315. Each of the server computers 1315 may be configured with an operating system, including without limitation any of those discussed above, as well as any commercially (or freely) available server operating systems. Each of the servers 1315 may also be running one or more applications, which can be configured to provide services to one or more clients 1305 and/or other servers 1315.

Merely by way of example, one of the servers 1315 may be a web server, which can be used, merely by way of example, to process requests for web pages or other electronic documents from user computers 1305. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1305 to perform methods of the invention.

The server computers 1315, in some embodiments, might include one or more application servers, which can be configured with one or more applications accessible by a client running on one or more of the client computers 1305 and/or other servers 1315. Merely by way of example, the server(s) 1315 can be one or more general purpose computers capable of executing programs or scripts in response to the user computers 1305 and/or other servers 1315, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle, Microsoft, Sybase™, IBM™ and the like, which can process requests from clients (including, depending on the configuration, dedicated database clients, API clients, web browsers, etc.) running on a user computer 1305 and/or another server 1315. In some embodiments, an application server can create web pages dynamically for displaying the information in accordance with various embodiments, such as webpages associated with accounts, representations of related subjects, records, documents, nodes, node connections, and/or node matches. Data provided by an application server may be formatted as one or more web pages (comprising HTML, Javascript, etc., for example) and/or may be forwarded to a user computer 1305 via a web server (as described above, for example). Similarly, a web server might receive web page requests and/or input data from a user computer 1305 and/or forward the web page requests and/or input data to an application server. In some cases a web server may be integrated with an application server.

In accordance with further embodiments, one or more servers 1315 can function as a file server and/or can include one or more of the files (e.g., application code, data files, etc.) necessary to implement various disclosed methods, incorporated by an application running on a user computer 1305 and/or another server 1315. Alternatively, as those skilled in the art will appreciate, a file server can include all necessary files, allowing such an application to be invoked remotely by a user computer 1305 and/or server 1315.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1320 (e.g., databases 115 and/or 140). The location of the database(s) 1320 is discretionary: merely by way of example, a database 1320*a* might reside on a storage medium local to (and/or resident in) a server 1315*a* (and/or a user computer 1305). Alternatively, a database 1320*b* can be remote from any or all of the computers 1305, 1315, so long as it can be in communication (e.g., via the network 1310) with one or more of these. In a particular set of embodiments, a database 1320 can reside in a storage-area network ("SAN") familiar to those skilled in the art. (Likewise, any necessary files for performing the functions attributed to the computers 1305, 1315 can be stored locally on the respective computer and/or remotely, as appropriate.) In one set of embodiments, the database 1335 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of building a representation of related individuals, comprising:
providing a database comprising digital records created from non-digital source documents, each digital record including genealogical information relating to an individual;
providing a set of users with access to the database using a computer system;
allowing a first user of the set of users to interact with a first record page via the computer system, wherein the first record page includes at least one digital record including genealogical information relating to an individual other than the first user, the interaction including one or more of:
modifying the first record page based on input from the first user, wherein the modification modifies the genealogical information of the at least one digital record included on the first record page; and
modifying or adding a node having genealogical information in a first set of user-created nodes in an account of the first user based at least partly on identifying information from the first record page;
identifying a subset of the set of users based at least partly on an existing or predicted relationship of the subset of users to the genealogical information in the first record page, wherein identifying a subset of users includes generating a score related to the potential relevance, to each of the set of users, of the interaction at the first record page; and
providing a notification to the subset of users related to the interaction.

2. The method of claim 1, wherein identifying the subset further comprises comparing the score to a threshold score.

3. The method of claim 1, further comprising relating an account component for each user of the subset to the interaction.

4. The method of claim 3, wherein the account component for at least some of the subset users comprises a previously defined relationship between the at least some of the subset users and the first record page.

5. The method of claim 1, further comprising:
creating a second database comprising the identified subset of users, each user being associated with the interaction;
receiving search queries comprising an identifier for at least one of the subset of users;
searching the database for interactions associated with the at least one user; and
providing search results related to the interactions associated with at least one user.

6. The method of claim 1, wherein the notification comprises updating websites associated with the subset of users' accounts.

7. The method of claim 1, wherein the one or more interaction steps further include:
modifying a setting of the account of the first user to save data related to the first record page.

8. A system for building a representation of related individuals, comprising:
a storage medium storing a database comprising digital records created from non-digital source documents, each digital record including genealogical information relating to an individual; and
a processor programmed to:
provide a set of users with access to the database using a computer system;
allow a first user of the set of users to interact with a first record page via the computer system, wherein the first record page includes at least one digital record including genealogical information relating to an individual other than the first user, the interaction including one or more of:
modifying the first record page based on input from the first user, wherein the modification modifies the genealogical information of the digital record included on the first record page; and
modifying or adding a node having genealogical information in a first set of user-created nodes in an account of the first user based at least partly on identifying information from the first record page;
identify a subset of the set of users based at least partly on an existing or predicted relationship of the subset of users' accounts to the first record page, including generating a score related to the potential relevance, to each of the set of users, of the interaction at the first record page; and
provide a notification to the subset of users related to the interaction.

9. The system of claim 8, wherein the processor is further configured to compare the score to a threshold score.

10. The system of claim 8 the processor is further configured to relate an account component for each user of the subset to the interaction.

11. The system of claim 10, wherein the account component for at least some of the subset users comprises a previously defined relationship between the at least some of the subset users and the first record page.

12. The system of claim 8, the processor is further configured to:
create a second database comprising the identified subset of users, each user being associated with the interaction;
receive search queries comprising an identifier for at least one of the subset of users;
search the database for interactions associated with the at least one user; and
provide search results related to the interactions associated with at least one user.

13. The system of claim 8, wherein the notification comprises updating websites associated with the subset of users' accounts.

14. The system of claim 8, wherein the one or more interaction steps further include:
modifying a setting of the account of the first user to save data related to the first record page.

15. A non-transitory computer-usable storage medium having computer readable instructions stored thereon for execution by a processor to perform a method comprising:
providing a database comprising digital records created from non-digital source documents, each digital record including genealogical information relating to an individual;
providing a set of users with access to the database using a computer system;
allowing a first user of the set of users to interact with the first record page via the computer system, wherein the first record page includes at least one digital record including genealogical information relating to an individual other than the first user, the interaction including one or more of:
modifying the first record page based on input from the first user, wherein the modification modifies the genealogical information of the digital record included on the first record page; and modifying or adding a node having genealogical information in a first set of user-created nodes in an account of the first user based at least partly on identifying information from the first record page;

identifying a subset of the set of users based at least partly on an existing or predicted relationship of the subset of users' accounts to the first record page, including generating a score related to the potential relevance, to each of the set of users, of the interaction at the first record page; and providing a notification to the subset of users related to the interaction.

16. The non-transitory medium of claim 15, wherein identifying the subset further comprises comparing the score to a threshold score.

17. The non-transitory medium of claim 15, wherein the method further comprises relating an account component for each user of the subset to the interaction.

18. The non-transitory medium of claim 17, wherein the account component for at least some of the subset users comprises a previously defined relationship between the at least some of the subset users and the first record page.

19. The non-transitory medium of claim 15, wherein the method further comprises:
- creating a second database comprising the identified subset of users, each user being associated with the interaction;
- receiving search queries comprising an identifier for at least one of the subset of users;
- searching the database for interactions associated with the at least one user; and
- providing search results related to the interactions associated with at least one user.

20. The non-transitory medium of claim 15, wherein the notification comprises updating websites associated with the subset of users' accounts.

21. The non-transitory computer-usable storage medium of claim 15, wherein the one or more interaction steps further include:
- modifying a setting of the account of the first user to save data related to the first record page.

* * * * *